Figure 1:
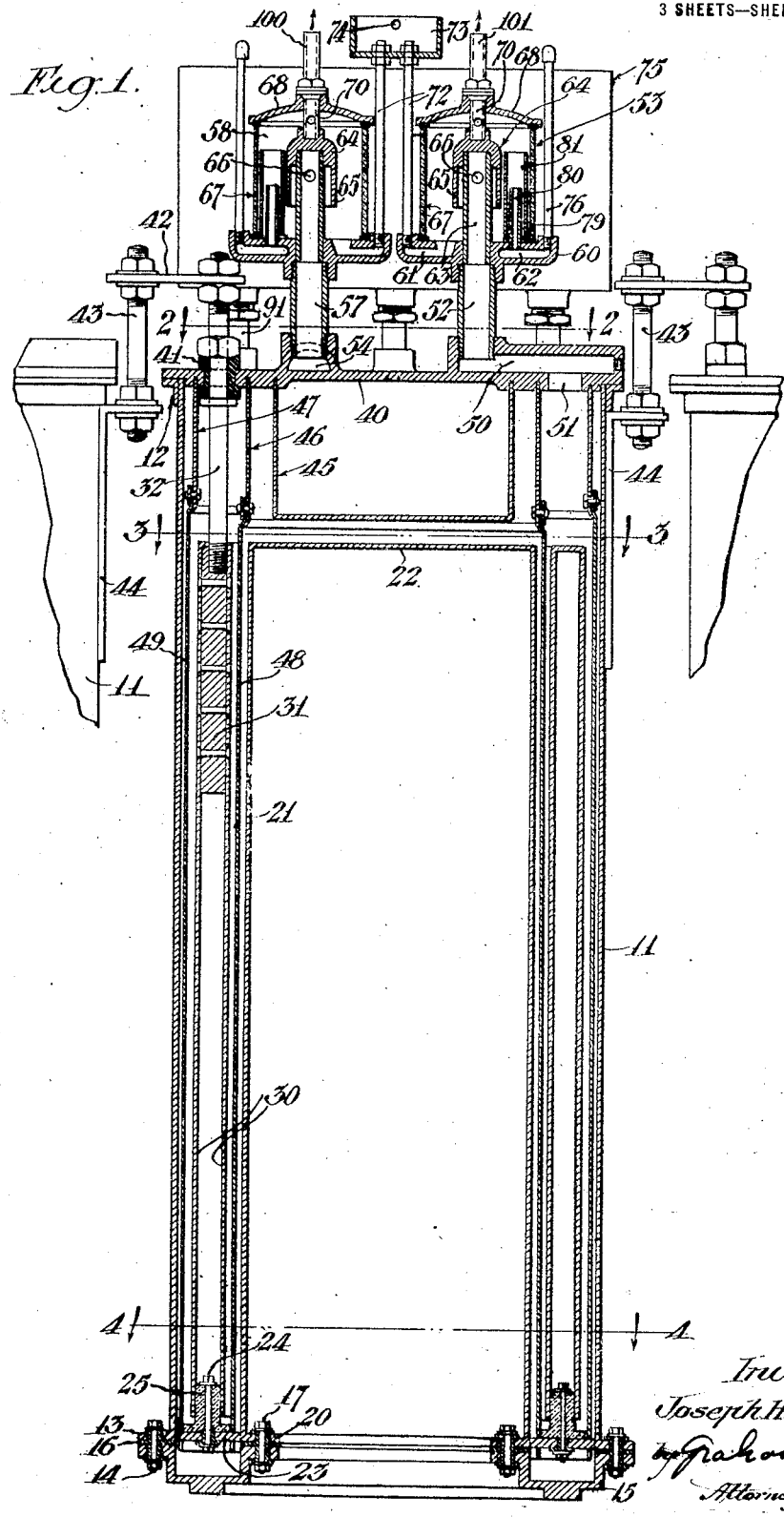

J. H. FISCHER.
OXYGEN CELL.
APPLICATION FILED APR. 1, 1919.

1,322,417.

Patented Nov. 18, 1919.
3 SHEETS—SHEET 1.

Inventor
Joseph H. Fischer
by Graham + Lain
Attorneys

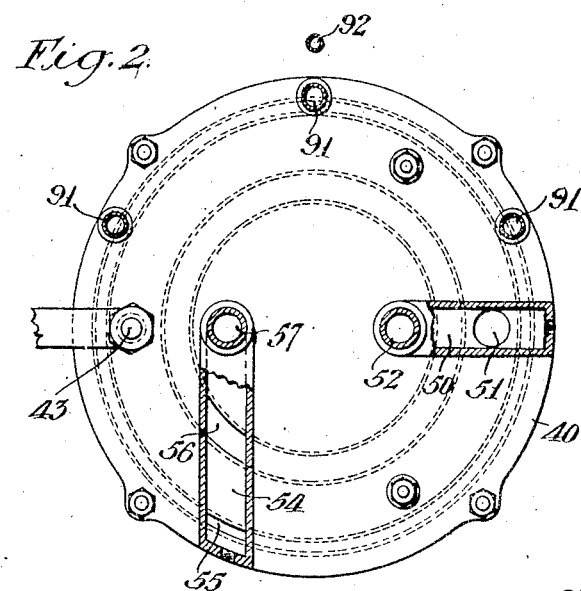
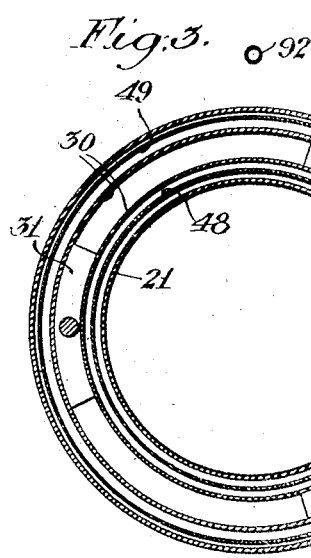
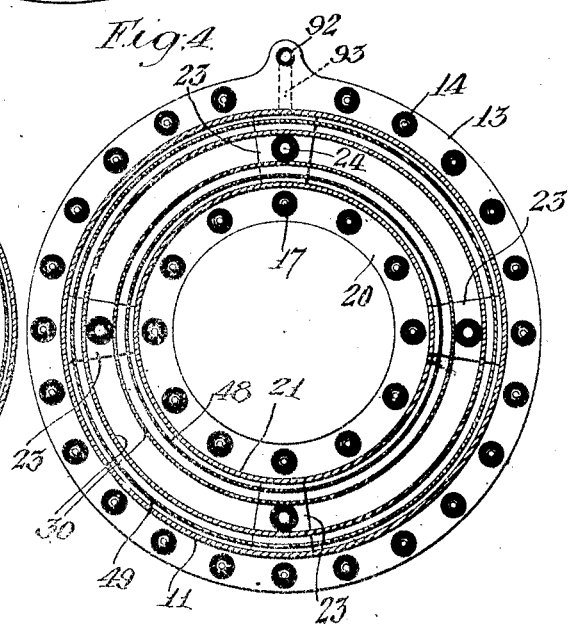

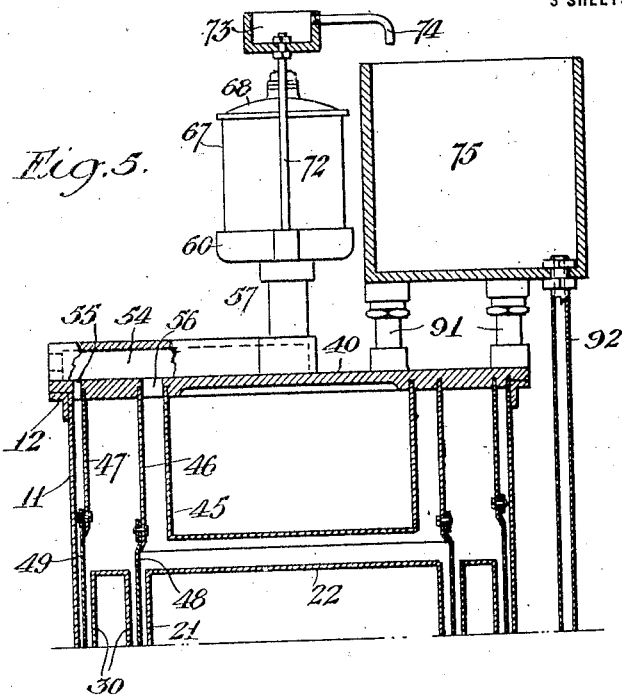

UNITED STATES PATENT OFFICE.

JOSEPH H. FISCHER, OF CHICAGO, ILLINOIS.

OXYGEN-CELL.

1,322,417.  Specification of Letters Patent.  Patented Nov. 18, 1919.

Application filed April 1, 1919. Serial No. 286,758.

*To all whom it may concern:*

Be it known that I, JOSEPH H. FISCHER, a citizen of the United States, residing at Chicago, in the county of Cook and State of Illinois, have invented a new and useful Improvement in Oxygen-Cells, of which the following is a specification.

My invention relates to the art of producing oxygen and hydrogen by passing electric currents through electrolytic cells and collecting the gases formed at the anode and cathode.

The object of my invention is to produce an oxyhydrogen cell which will have a very large area of active surface and in which the separation of the plates can conveniently be made uniform.

My invention resides in the novel combination of parts hereinafter more specifically set forth. Further objects and advantages will be made evident hereinafter.

Referring to the drawings, which are for illustrative purposes only, Figure 1 is an elevation partly in section on a central plane of a cell embodying my invention. Fig. 2 is a section on a plane represented by line 2—2 Fig. 1, this plane being viewed in the direction of the arrows. Fig. 3 is a section on a plane represented by line 3—3 of Fig. 1, this plane being viewed in the direction of the arrows. Fig. 4 is a section on a plane represented by line 4—4 of Fig. 4, this plane being viewed in the direction of the arrows. Fig. 5 is an elevation partly in section on a plane at right angles to plane of Fig. 1.

In the form of the invention illustrated in the drawings, the cylindrical shell 11 is provided with a flange 12 on the upper end thereof and a flange 13 on the lower end thereof. Secured to the flange 13 by insulated bolts 14 is a cast base 15 which is electrically insulated from the flange 13 by any suitable sort of insulating material 16. Also, secured to the base 15 by means of insulated bolts 17 is a lower flange 20 formed on an inner cylindrical drum 21 having a tight head 22. Welded between the shell 11 and the drum 21 are four bridges 23. Secured to each of the bridges 23 by means of a bolt 24 is a glass spacing insulator 25. Spaced apart, centered and supported by the glass insulators 25 are two concentric anode cylinders 30 which are also spaced apart at various points around their circumference by spacing blocks 31. At least one of these spacing blocks 31 must be metallic, forming a convenient point for the attachment of the anode terminal 32. The cylinders 30 form what may be conveniently termed the "anode" of the cell, the drum 21 and the shell 11 forming the "cathode."

It will be noted that members 11, 21 and 30 are concentric cylinders. It is comparatively easy to form metal members which are nearly cylindrical and particularly where they are braced together by spaces similar to the spaces 31 in cylinders 30. It is, therefore, comparatively easy to make the annular spaces formed between the anode and cathode of quite uniform thickness so that the passage of the current between will be fairly uniform.

Secured on the flange 12 is a top 40 which may conveniently be a casting the anode terminal 32 passing therethrough and being insulated therefrom by suitable insulation 41. Each of the anode terminals 32 may be connected through a strap 42 with a cathode terminal 43, each of the cathode terminals 43 being secured in electrical contact with a bent strap 44 secured to the shell 11.

Cast in the top 40 is an upper drum 45— this drum being cylindrical and centrally located and concentric with the shell 11. Surrounding the drum 45 are cylinders 46 and 47 which will hereafter be designated as the "inner and outer apron supports." Secured to the inner apron support 46 is an asbestos (or other fabric) apron 48 and similarly secured to outer apron support 47 is an outer apron 49 also formed of asbestos or other fabric. Aprons 48 and 49 extend to the bottom of the cell.

Formed in the cast iron top 40 is an oxygen opening 50 which communicates through an opening 51 with the space between the two aprons 48 and 49, through which the oxygen gas is fed to the oxygen tube 52, communicating with the seal 53. Also, formed on the top 12 is a hydrogen opening 54 which communicates through openings 55 and 56 with the space outside the apron 49 and inside the apron 48, hydrogen being delivered through the opening 54 to the tube 57 communicating with the hydrogen seal 58.

The seals 53 and 58 are similar in construction, each consisting of a base 60 having a filling opening 61 and an overflow opening 62 therein. A tube 63 extends upwardly through the center thereof and carries a hood 64 having a downwardly projecting lip 65. Openings 66 are formed in the tube 63 inside the lip 65. A glass cylinder 67 is seated on the casting 60, with suitable gaskets, having a top 68 seated thereon, with suitable gaskets, and the top 68 is connected to the hood 64 by means of a perforated pipe 70 which extends up and forms the point at which the gas is taken off. The opening 61 communicates with the interior of the glass cylinder 67 and is connected through a pipe 72 with a filling pan 73. This filling pan 73 is provided with an overflow pipe 74 which extends out over a balance tank 75. An overflow pipe 76 communicates with the opening 62 and also extends out over the balance tank 75. A tube 80 is secured in the pipe 60 communicating with the opening 62; this tube 80 being surrounded by cylinder 81 which is provided with small openings 79 near the bottom thereof. The balance tank 75 is supported on three rods 91 and is connected by means of a pipe with an opening 93 which extends through the base 15 and connects with a space inside the shell 11 and the drum 21.

The method of operation is as follows: The balance tank is filled with electrolyte which passes downwardly through the pipe 92 to the space between the drum 21 and the shell 11, filling it approximately to the top 22 of the drum 21. The electric current now being sent through the shell a decomposition takes place, hydrogen being released from the surfaces of the cathodes 11 and 21 and oxygen being released from the surfaces of the anodes 30. The hydrogen is delivered through the openings 55 and 56 to the opening 54 passing through the hydrogen seal 58 and being delivered through a hydrogen pipe 100. The oxygen generated on the surfaces of the anode rises into spaces between the cylinders 46 and 47 passing through the opening 51 and the opening 50 into the pipe 52 and through the oxygen seal 53 to the oxygen pipe 101.

I claim as my invention:

1. An electrolytic cell comprising a cylindrical shell; a base on which said shell is supported; an inner drum also supported on said base concentric with and inside said shell; material for electrically insulating said shell and said drum from said base; bridges electrically connecting said drum to said shell; a top secured in gas tight relationship with and supported on said shell; two concentric anode cylinders situated between and concentric with said shell and said drum; means for spacing said anode cylinders with relation to each other; glass spacing insulators on which said cylinders are supported; an anode terminal electrically connected to said anode cylinders and passing through said top; means for insulating said anode terminal from said top; an inner apron support in the form of a cylinder secured to said top concentric with said shell; an outer apron support in the form of a cylinder secured to said top concentric with said shell; an outer apron secured to said outer apron support and forming a porous diaphragm between said shell and said anode cylinders; an inner apron secured to said inner apron support and forming a porous diaphragm between said drum and said anode cylinders; a balance tank supported on and above said top; and a pipe connecting said balance tank with the bottom of the space between said shell and said drum.

2. An electrolytic cell comprising a cylindrical shell; a base on which said shell is supported; an inner drum also supported on said base concentric with and inside said shell; a top secured in gas tight relationship with and supported on said shell; two concentric anode cylinders situated between and concentric with said shell and said drum; means for spacing said anode cylinders with relation to each other; glass spacing insulators on which said cylinders are supported; an anode terminal electrically connected to said anode cylinders and passing through said top; an inner apron support in the form of a cylinder secured to said top concentric with said shell; an outer apron support in the form of a cylinder secured to said top concentric with said shell; an outer apron secured to said outer apron support and forming a porous diaphragm between said shell and said anode cylinders; an inner apron secured to said inner apron support and forming a porous inner apron support and forming a porous diaphragm between said drum and said anode cylinders; a balance tank supported on and above said top; and a pipe connecting said balance tank with the bottom of the space between said shell and said drum.

3. An electrolytic cell comprising a cylindrical shell; a base on which said shell is supported; an inner drum also supported on said base concentric with and inside said shell; a top secured in gas tight relationship with and supported on said shell; two concentric anode cylinders situated between and concentric with said shell and said drum; glass spacing insulators on which said cylinders are supported; an anode terminal electrically connected to said anode cylinders and passing through said top; means for insulating said anode terminal from said top; an inner apron support in the form of a cylinder secured to said top concentric with said shell; an outer apron support in the form of a cylinder secured to said top concentric with said shell; an outer apron secured to outer apron support and forming a porous diaphragm between said shell and said anode cylinders; an inner apron secured to said inner apron support and forming a porous diaphragm between said drum and said anode cylinders; a balance tank supported on and above said top; and a pipe connecting said balance tank with the bottom of the space between said shell and said drum.

4. An electrolytic cell comprising a cylindrical shell; a base on which said shell is supported; an inner drum also supported on said base concentric with and inside said shell; a top secured in gas tight relationship with and supported on said shell; two concentric anode cylinders situated between and concentric with said shell and said drum; an anode terminal electrically connected to said anode cylinders and passing through said top; means for insulating said anode terminal from said top; an inner apron support in the form of a cylinder secured to said top concentric with said shell; an outer apron support in the form of a cylinder secured to said top concentric with said shell; an outer apron secured to outer apron support and forming a porous diaphragm between said shell and said anode cylinders; an inner apron secured to said drum and said anode cylinders; a balance tank supported on and above said top; and a pipe connecting said balance tank with the bottom of the space between said shell and said drum.

5. An electrolytic cell comprising a cylindrical shell; a base on which said shell is supported; an inner drum also supported on said base concentric with and inside said shell; a top secured in gas tight relationship with and supported on said shell; two concentric anode cylinders situated between and concentric with said shell and said drum; glass spacing insulators on which said cylinders are supported; an anode terminal electrically connected to said anode cylinders and passing through said top; means for insulating said anode terminal from said top; an inner apron support in the form of a cylinder secured to said top concentric with said shell; an outer apron support in the form of a cylinder secured to said top concentric with said shell; an outer apron secured to outer apron support and forming a porous diaphragm between said shell and said anode cylinders and an inner apron secured to said inner apron support and forming a porous diaphragm between said drum and said anode cylinders.

6. An electrolytic cell comprising a cylindrical shell; a drum inside of and concentric with said shell and electrically connected therewith; a metal cylinder intermediate of and concentric with said shell and said drum; a porous diaphragm between said shell and said cylinder; a porous diaphragm between said cylinder and said drum; and a tight cover having gas channels formed therein.

In testimony whereof, I have hereunto set my hand at Los Angeles, California, this 27th day of March, 1919.

JOSEPH H. FISCHER.